(12) United States Patent
Adema et al.

(10) Patent No.: US 9,778,478 B1
(45) Date of Patent: Oct. 3, 2017

(54) PROJECTOR WITH IMAGE PLANE MODAL VIBRATION FOR SPECKLE REDUCTION

(71) Applicant: CHRISTIE DIGITAL SYSTEMS USA, INC., Cypress, CA (US)

(72) Inventors: Daniel Robert Adema, Kitchener (CA); Darren Pastrik, Kitchener (CA); Graham Hill, Waterloo (CA)

(73) Assignee: CHRISTINE DIGITAL SYSTEMS USA, INC., Cypress, CA (US)

( * ) Notice: Subject to any disclaimer, the term of this patent is extended or adjusted under 35 U.S.C. 154(b) by 0 days.

(21) Appl. No.: 15/285,047

(22) Filed: Oct. 4, 2016

(51) Int. Cl.
*G03B 21/14* (2006.01)
*G02B 27/48* (2006.01)
*G03B 21/20* (2006.01)
*G03B 21/00* (2006.01)

(52) U.S. Cl.
CPC ........... *G02B 27/48* (2013.01); *G03B 21/005* (2013.01); *G03B 21/142* (2013.01); *G03B 21/208* (2013.01); *G03B 21/2033* (2013.01)

(58) Field of Classification Search
CPC .................................. G02B 27/48; H04N 9/31
See application file for complete search history.

(56) References Cited

U.S. PATENT DOCUMENTS

| 4,035,068 | A | 7/1977 | Rawson |
|---|---|---|---|
| 4,155,630 | A | 5/1979 | Ih |
| 4,256,363 | A | 3/1981 | Briones |
| 5,272,473 | A | 12/1993 | Thompson et al. |
| 5,313,479 | A | 5/1994 | Florence |
| 6,081,381 | A | 6/2000 | Shalapenok et al. |
| 6,154,259 | A | 11/2000 | Hargis et al. |
| 6,594,090 | B2 | 7/2003 | Kruschwitz et al. |
| 7,510,284 | B2 | 3/2009 | Plut |
| 7,593,159 | B2 | 9/2009 | Yokoyama et al. |
| 7,922,333 | B2 | 4/2011 | Akahane et al. |
| 8,059,340 | B2 | 11/2011 | Khan et al. |
| 8,622,553 | B2 | 1/2014 | Chuang |
| 8,724,218 | B2 | 5/2014 | Curtis et al. |
| 8,748,806 | B2 | 6/2014 | Sqalli et al. |
| 9,164,365 | B2 | 10/2015 | Schuck |
| 2014/0055755 | A1* | 2/2014 | Fan .................... G02B 27/1033 353/31 |

FOREIGN PATENT DOCUMENTS

| CN | 103293700 A | 9/2013 |
|---|---|---|
| EP | 1283434 B1 | 10/2012 |

\* cited by examiner

*Primary Examiner* — Sultan Chowdhury
*Assistant Examiner* — Danell L Owens
(74) *Attorney, Agent, or Firm* — Perry + Currier, Inc.

(57) ABSTRACT

A projector with image plane modal vibration for speckle reduction is provided. The projector includes: a laser light source; a light modulator; and optics that convey light from the laser to the modulator and project modulated light from the modulator, the optics comprising an image plane. The projector further includes: a surface comprising at least a first region located at the image plane, the first region being at least as large as an image formed at the image plane, the first region configured to one or more of transmit and reflect the image; and at least three actuators, positions of interaction of the actuators with the surface are asymmetric relative to the surface, the actuators configured to generate respective moving surface waves in the first region at respective frequencies, the respective frequencies comprising non-integer multiples of each other.

16 Claims, 7 Drawing Sheets

PROJECTOR WITH IMAGE PLANE MODAL VIBRATION FOR SPECKLE REDUCTION

FIELD

The specification relates generally to projectors, and specifically to a projector with image plane modal vibration for speckle reduction.

BACKGROUND

Projectors and/or laser projection systems which use laser light sources generally suffer from speckle. One solution to mitigate speckle in such projectors is to vibrate the projection screen. However, vibration of a projection screen, which tends to be very large and often curved, requires complex systems, and customization of movie theatres, which is expensive. Another solution for mitigating speckle in such projectors is to vibrate optical elements (lenses, integrator rods, diffusers, mirrors, etc.) in the illumination path within the projector in a rigid-body mode. However, such vibration does not always reduce speckle to a level where it is not visible to a viewer.

SUMMARY

In general, this disclosure is directed to a laser projector that includes: a surface comprising at least a first region located at an image plane in the projector, the first region being at least as large as an image formed at the image plane, the first region configured to one or more of transmit and reflect the image formed at the image plane; and at least three actuators asymmetrically positioned relative to the surface, the at least three actuators configured to generate respective moving surface waves in the first region at respective frequencies, the respective frequencies comprising non-integer multiples of each other. Hence, the actuators cause surface waves in at least the first region that are free of nodes, and points of the image formed at the image plane experience different light paths which can mitigate speckle. Generally, the surface can be located at an image plane between an integrator and a light modulator of the projector such that the image at the image plane at the first region is simply an image of an output end of the integrator; however, the image plane can also be located between the image modulator and a projection lens of the projector, for example at projection optics.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

An aspect of the specification provides a projector comprising: a laser light source; a light modulator; optics configured to convey light from the laser light source to the light modulator and to project modulated light from the light modulator, the optics comprising an image plane at which an image is formed by the optics by the light from the laser light source; a surface comprising at least a first region located at the image plane, the first region being at least as large as the image formed at the image plane, the first region configured to one or more of transmit and reflect the image formed at the image plane; and at least three actuators, positions of interaction of the least three actuators with the surface are asymmetric relative to the surface, the at least three actuators configured to generate respective moving surface waves in the first region at respective frequencies, the respective frequencies comprising non-integer multiples of each other.

The respective frequencies can further comprise non-harmonics of each other.

The positions of interaction of the at least three actuators to the surface can be selected to eliminate standing nodes formed by the respective moving surface waves in at least the first region.

Each of the at least three actuators can be configured to change a respective frequency of the respective moving surface waves from a first respective frequency to one or more respective harmonic frequencies. Each of the at least three actuators can be configured to change the respective frequency of the respective moving surface waves from the first respective frequency to the one or more respective harmonic frequencies and back to the first respective frequency in a sequence.

Each of the at least three actuators can be positioned to interact with the surface outside the first region.

Each of the at least three actuators can comprise an eccentrically mounted rotational motor.

The first region can be configured to transmit the image formed at the image plane, and the surface can further comprise a second region connected to the first region, and the positions of interaction of the at least three actuators with the surface are located in the second region.

The surface can comprise a front side, located at the image plane, and a back side, and the first region can be located on the front side and can be configured to reflect the image formed at the image plane, the positions of interaction of the at least three actuators to the surface being located the back side.

The surface can comprise a front side, located at the image plane, a back side, and a second region connected to the first region, and the first region can be located on the front side and can be configured to reflect the image formed at the image plane, the positions of interaction of the at least three actuators to the surface can be located at one or more of the back side and in the second region.

The projector can further comprise a mounting apparatus, and the surface can be attached to the mounting apparatus at one or more mount points. Each of the one or more mount points can comprise a damping apparatus configured to damp one or more of the respective moving surface waves in the first region. Each of the one or more mount points can be located outside of the first region.

The optics can comprise an integrating rod located between the laser light source and the light modulator, and the image plane can be located to receive images from an output face of the integrating rod such that the first region of the surface changes relative light paths of the light from the laser light source in the images.

The surface can comprise one or more of glass, high temperature glass, plastic, and high temperature plastic.

The projector can further comprise a rigid-body vibrating device configured to induce rigid body vibration of the surface.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
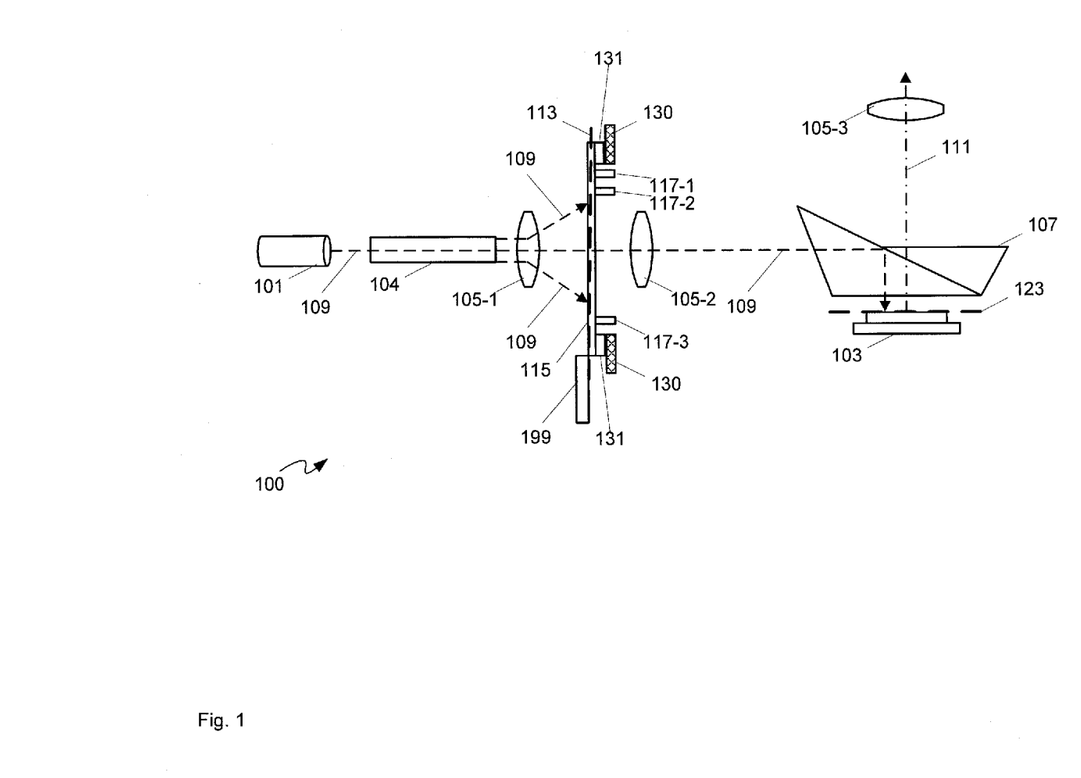
FIG. 1 depicts a schematic diagram of a projector with image plane modal vibration for speckle reduction, according to non-limiting implementations.

Attention is directed to FIG. 1 which depicts a schematic diagram of a projector 100 with image plane modal vibration for speckle reduction. Projector 100 comprises: a laser light source 101; a light modulator 103; optics (schematically represented by integrator rod 104, lenses 105-1, 105-2, 105-3 and prism 107) configured to convey light 109 from laser light source 101 to light modulator 103 and to project modulated light 111 from light modulator 103, the optics comprising an image plane 113 at which an image is formed by the optics by light 109 from laser light source 101; a surface 115 comprising at least a first region (as described below with respect to FIG. 2) located at image plane 113, the first region being at least as large as the image formed at image plane 113, the first region configured to one or more of transmit and reflect the image formed at the image plane 113; and at least three actuators 117-1, 117-2, 117-3, positions of interaction of least three actuators 117-1, 117-2, 117-3 with surface 115 are asymmetric relative to surface 115, at least three actuators 117-1, 117-2, 117-3 configured to generate respective moving surface waves in the first region at respective frequencies, the respective frequencies comprising non-integer multiples of each other.

Lenses 105-1, 105-2, 105-3 will be referred to hereafter, collectively, as lenses 105 and, generically, as a lens 105; similarly, actuators 117-1, 117-2, 117-3 will be referred to hereafter, collectively, actuators 117 and, generically, as an actuator 117.

Furthermore, while three lenses 105 are depicted, it is appreciated that projector 100 can comprise more than three lenses 105 or fewer than three lenses 105; indeed, optics of projector 100 can comprise any number of optical components that convey light 109 from laser light source 101 to light modulator 103 and to project modulated light 111 from light modulator 103 including, but not limited to, prisms, mirrors, lenses of any suitable type, further integrator rods etc. Hence, it is appreciated that optics of projector 100 are merely depicted schematically.

Similarly, light 109, 111 is also depicted schematically, merely to show a light path through projector 100. For example, while generally not depicted, it is appreciated that light 109 from laser light source 101 received at integrator rod 104 is integrated and/or homogenized by integrator rod 104 and that light 109 exiting integrator rod 104 forms an image corresponding to dimensions of an output face of integrator rod 104 (e.g. the image comprises a rectangle, and the like, having an aspect ratio similar to an aspect ratio of light modulator 103), which is projected by lens 105-1 onto image plane 113; the image formed by light 109 at image plane 113 is conveyed to light modulator 103, by lens 105-2 and prism 107. In other words, light modulator 103 is illuminated by the image conveyed thereto from image plane 113, and light modulator 103 modulates light 109 in the image to form modulated light 111; hence, projector 100 comprises at least a second image plane 123 located at a surface of light modulator 103. Modulated light 109 generally comprises an image to projected, which is conveyed out of projector 100 by prism 107 and lens 105-3.

In some implementations, laser light source 101 can comprise a single color laser light source, and projector 100 can comprise further light sources, of other colors, and further light modulators etc., and optics of projector 100 can combine images from the further light sources with images in depicted modulated light 111 to project full colour images. Alternatively, laser light source 101 can be configured to sequentially illuminate light modulator 103 with different colors which can modulate each accordingly, and images of the different colors can be projected sequentially thereby projecting full colour images. It is further understood that at least light modulator 103 can be controlled by a controller (e.g. a computing device and the like, not depicted) to modulate light 109 to produce modulated light 111.

Hence, it should be understood that a wide variety of configurations for projector 100 are contemplated. For example, while not depicted, it is further appreciated that projector 100 can comprises a housing, and the like, and/or internal mechanical components to which optical components are mounted, as well as any other components used for operation of projector 100 including, but not limited to, cooling components and the like.

Also depicted in FIG. 1 is a mounting apparatus 130 (in cross section) which can include, but is not limited to a frame and the like configured to allow light 109, including images at image plane 113, to be transmitted there through; hence mounting apparatus 130 includes an aperture that is at least as large as image plane 113. In particular, surface 115 is depicted as being attached to mounting apparatus 130 at one or more mount points 131 (as depicted, two mount points 131). In general, mounting apparatus 130 and one or more mount points 131 are configured to position surface 115 at image plane 113; however, in some implementations, each of one or more mount points 131 can comprises a damping apparatus configured to damp one or more of the respective moving surface waves in the first region. Furthermore, mounting apparatus 130 can comprise a component and/or a section of a housing of projector 100 and/or mounting apparatus 130 can comprise one or more separate mechanical components which are in turn mounted to a housing of projector 100.

While not depicted, actuators 117 can also be mounted to mounting apparatus 130

In addition, while actuators 117, mounting apparatus 130 and mount points 131, are depicted as being located opposite an integrator-side of surface 115, in other implementations, actuators 117, mounting apparatus 130 and mount points 131 can be located on an integrator-side of surface 115; in yet further implementations, mounting apparatus 130 can be located on both sides of surface 115 and/or one or more sides of surface 115; similarly, actuators 117 and mount points 131 can be located on both sides of surface 115 and/or one or more sides of surface 115.

Figure 2:
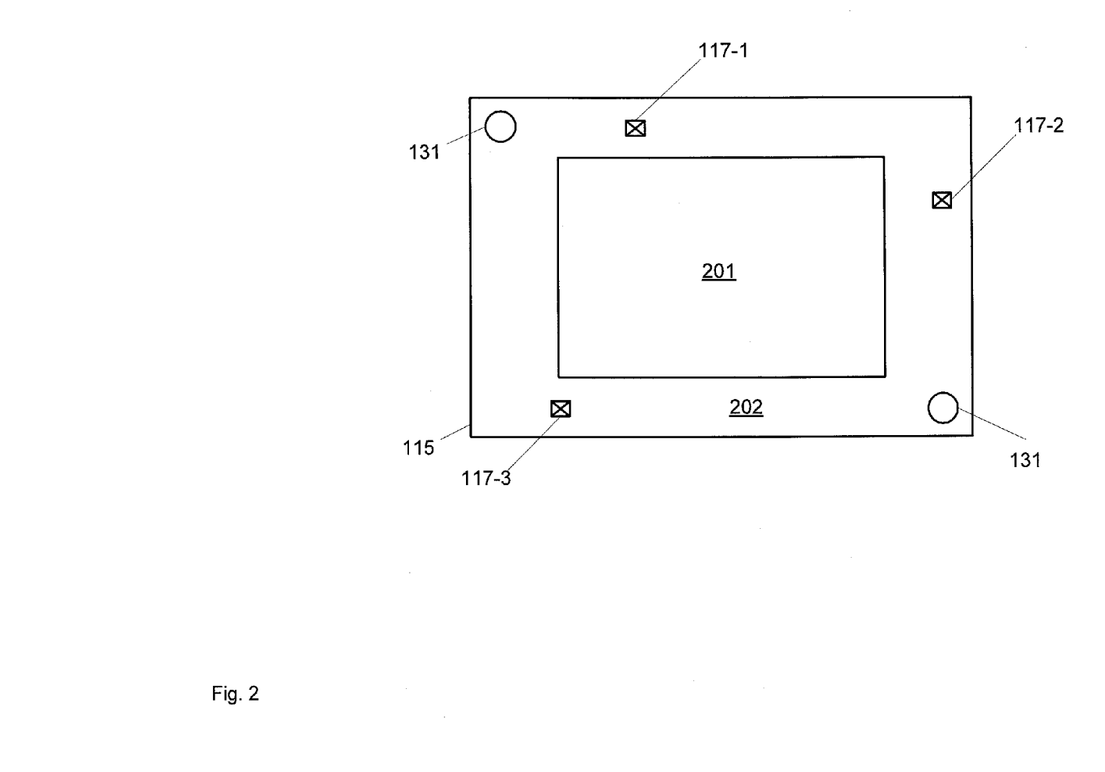
FIG. 2 depicts a schematic view of a surface located at an image plane of the projector of FIG. 1, from a side opposite an integrator-side, according to non-limiting implementations.

In FIG. 1, surface 115, actuators 117 and mount points 131 are depicted schematically depicted in a side view. Hence attention is next directed to FIG. 2, which depicts a schematic perspective view of surface 115, actuators 117 and mount points 131 from a side facing lens 105-2 (e.g. a side opposite an integrator-side of surface 115). In particular, FIG. 2 depicts first region 201 located at image plane 113, first region 201 being at least as large as the image formed at image plane 113, first region 201, as depicted, configured to transmit the image formed at image plane 113.

In other words, in depicted implementations, first region 201 is configured to transmit the image formed at image plane 113; hence, at least first region 201 is generally transparent to light 109 and images formed thereby. Indeed, an aspect ratio and dimensions of first region 201 can be similar to, and/or larger than, the image produced at image plane 113 such that the image is transmitted through first region 201; for example, dimensions of first region 201 can be larger than the image at image plane 113 so that efficiency of transmission of light 109 through surface 115 that exits integrator rod 104 is maximized.

Hence, surface 115, and in particular, first region 201, can comprise a generally transparent material including, but not limited to, glass, high temperature glass, plastic, high temperature plastic, and the like; specifically, a material of first region 201, and surface 115, is selected which is compatible with temperatures that occur in laser projectors.

In addition, the material of at least first region 201 is of a thickness that is compatible with surface waves produced by actuators 117. For example, as described below, each of actuators 117 vibrate which causes surfaces waves at least in first region 201, and the material of at least first region 201 is of a thickness that will enable such surface waves to move through first region 201. For example, in some implementations a least first region 201 can comprise a glass plate that is about 1 mm thick or less.

However, first region 201 and image plane 113 need not be exactly coincident; for example, with brief reference to FIG. 1, image plane 113 is located inside surface 115 and hence adjacent first region 201.

Furthermore, as depicted, surface 115 further comprises a second region 202 connected to first region 201, and positions of interaction of at least three actuators 117 with surface 115 are located in second region 202, as are positions of attachment of mounting points 131, so as to not block light 109 as it passes through first region 201.

As depicted, second region 202 surrounds first region 201 and indeed, second region 202 and first region 201 can be integral with each other. Alternatively, second region 202 can comprise a frame and/or other device supporting first region 201 (which can alternatively be integrated with mounting apparatus 130). In yet further alternative implementations, second region 202 can comprise one or more tabs, and the like, extending from first region 201 to positions of interaction of actuators 117 and/or mounting points 131. Regardless of an implementation of second region 202, each of at least three actuators 117 are positioned to interact with surface 115 outside first region 201, and each of one or more mount points 131 is located outside of first region 201.

Furthermore, while second region 202 can be transparent, second region 202 need not be transparent and hence can be opaque and/or semi-opaque, and the like.

Indeed, it should be understood that a wide variety of configurations for surface 115, first region 201 and second region 202 are contemplated, as long as surface waves and/or vibrations produced by actuators 117 that originate in second region 202 translate to surface waves in first region 201. For example, in some implementations, first region 201 and second region 202 can comprise a glass plate that is about 1 mm thick or less; in these implementations; other than actuators 117 and mounting points 131 being located outside of first region 201, there need not be anything physically distinguishing second region 202 from first region 201.

Figure 3:
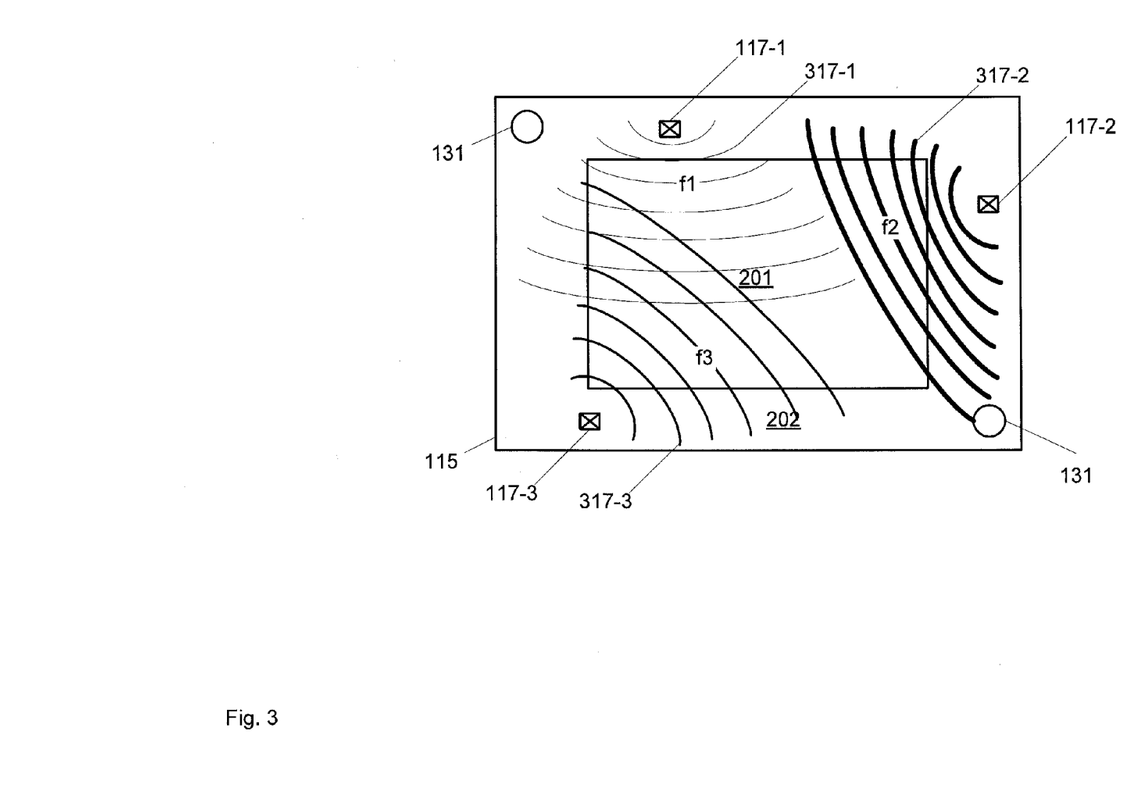
FIG. 3 depicts the surface of FIG. 2 in operation, according to non-limiting implementations.

Operation of surface 115 and actuators 117 will now be described with respect to FIG. 3, which is substantially similar to FIG. 2, with like elements having like numbers. In FIG. 3, each of actuators 117 have been turned "on" and are vibrating second region 202 to produce moving surface waves 317-1, 317-2, 317-3. For example, actuators 117 can be controlled by a controller, which can be similar or different from a controller which controls light modulator 103; alternatively, actuators 117 can be configured to turn "on" when projector 100 is operational, and actuators 117 can otherwise operate independent of light modulator 103.

As depicted in FIG. 3, moving surface waves 317-1 are produced by actuator 117-1, moving surface waves 317-2 are produced by actuator 117-2, and moving surface waves 317-3 are produced by actuator 117-3. Moving surface waves 317-1, 317-2, 317-3 will interchangeably be referred to hereafter, collectively, as surface waves 317 and, generically, as a surface wave 317. For example, each of at least three actuators 117 can comprise an eccentrically mounted rotational motor operating at a frequency similar to a desired frequency of a respective moving surface waves 317 produced thereby; each eccentrically mounted rotational motor can vibrate against and/or perpendicular to surface 115 thereby generating a corresponding surface wave 317. However, any suitable actuator 117 that can produce a surface wave 317 is within the scope of present implementations.

Furthermore, in FIG. 3, each of surface waves 317 are depicted as a series of arcs which show, for example peaks of respective surface waves 317. Furthermore, each series of arcs is depicted in different line thicknesses to distinguish moving surface waves 317-1, 317-2, 317-3 from each other. In addition, whole each series of arcs is depicted as being only over a portion of first region 201, it is understood that moving surface waves 317 move across the entirety of at least first region 201, though moving surface waves 317 can be optionally damped at mount points 131 (and/or at an attachment point and/or an interaction point and/or a contact point for an actuator 117 different from an actuator 117 that generated a given surface wave 317).

In addition, while surface waves 317 are depicted as being located only on one side of surface 115, in some implementations, surface waves 317 can translate to both sides of surface 115.

In particular, surface waves 317 comprise waves and/or ripples in surface 115 that move through at least first region 201 perpendicular to a normal of first region 201, and are different from any rigid body motion of surface 115; in other words, while in some implementations, surface 115 can vibrate as a rigid body, in addition to surface waves 317 being produced, surface waves 317 generate path differences in light 109 as light 109 moves through image plane 113. Put another way, surface waves 317 generate mode shapes at image plane 113 to generate such path differences which can result in speckle reduction in light 109.

However, surface waves 317 are produced in such a manner so that at first region 201, surface 115 includes random vibration and/or pseudo-random vibration; further, surface waves 317 are produced to minimize chances of standing waves and/or nodes in first region 201. Such production of random vibration and/or pseudo-random vibration, \ can occur by: using at least three actuators 117; positioning at least three actuators 117 relative surface 115 asymmetrically; positioning at at least three actuators 117 to interact with surface 115 asymmetrically; and controlling actuators 117 to produce surface waves 317 that have frequencies that are non-integer multiples of each other.

For example, as depicted, positions of interaction of three actuators 117 are asymmetrically positioned relative to surface 115. In other words, actuators 117 are positioned at surface 115 to avoid symmetry between their interaction points with surface 115; hence, for example, a straight line between any two actuators 117 will not equally divide surface 115 and/or first region 201 into two equal areas. Put another way, positions at least three actuators 117 relative to surface 115 are selected to eliminate and/or minimize standing nodes formed by respective moving surface waves 317 in at least first region 201.

Furthermore, actuators 117 are operated so as to ensure that respective surface waves 317 produced by each are not harmonics of each other. For example, actuator 117-1 generates moving surfaces waves 317-1 having a frequency f1, actuator 117-2 generates moving surfaces waves 317-2 having a frequency f2, and actuator 117-3 generates moving surfaces waves 317-3 having a frequency f3. Furthermore, each of frequencies f1, f2, f3 are selected such that: $f1 \neq n*f2$, $f1 \neq n*f3$, and $f2 \neq n*f3$, where n is an integer. In other words, respective frequencies f1, f2, and f3 of moving surface waves 317-1, 317-2, 317-3 are non-integer multiples of each other to reduce and/or minimize and/or eliminate the chance of producing a standing wave and/or a node in first region 201. Put another way, respective frequencies f1, f2, and f3 comprise non-harmonics of each other.

Hence, at least in first region 201, surface waves 317 can cause path differences in light 109 through surface 115 to change constantly from point to point as surface waves 317 move, and as the sum total of the motion of surface waves 317 is random and/or pseudo-random, and as nodes and/or standing waves are reduced and/or eliminated, which can reduce and/or eliminate speckle. Put another way, in implementations depicted in FIG. 1, the optics of projector 100 comprises integrating rod 104 located between laser light source 101 and light modulator 103, and image plane 113 is located to receive images from an output face of integrating rod 104 such that first region 201 of surface 115 changes relative light paths of light 109 from laser light source 101 in the images.

Put yet another way, the sum total of the motion of surface waves 317 can result in the motion of any given point in at least first region 201 being random and/or pseudo-random.

In yet further implementations, to further assist with the sum total of the motion of surface waves 317 resulting in the motion of any given point in at least first region 201 being random and/or pseudo-random, one or more of each of at least three actuators 117 can be configured to change a respective frequency of the respective moving surface waves 317 from a first respective frequency to one or more respective harmonic frequencies. For example, actuator 117-1 can be configured to change a frequency of standing wave 317-1 from frequency f1 to a frequency 2*f1, to a frequency 3*f1, and then back to frequency f1; similarly, actuator 117-2 can be configured to change a frequency of standing wave 317-2 from frequency f2 to a frequency 2*f2, to a frequency 3*f2, and then back to frequency f2; and, similarly, actuator 117-2 can be configured to change a frequency of standing wave 317-2 from frequency f3 to a frequency 2*f3, to a frequency 3*f3, and then back to frequency f3.

However, when an actuator 117 and/or a corresponding moving surface wave 317 changes frequency, they need not change a sequence of first harmonic frequency, second harmonic frequency, third harmonic frequency etc. Indeed, a sequence in which an actuator 117 and/or a corresponding moving surface wave 317 changes frequency can be random, pseudo-random and/or in any given sequence.

Furthermore, while each actuator 117 is described as changing a respective frequency of the respective moving surface waves 317 from a first respective frequency to one or more of a first three respective harmonic frequencies, each of actuator 117 can be configured to change from a respective frequency to any respective harmonic frequency.

Furthermore, in implementations where actuators 117 can change to respective harmonic frequencies, a time that a given actuator 117 changes to a respective harmonic frequency can be the same or different from a time that other actuators 117 change to a respective harmonic frequency; indeed, times that each actuator 117 changes to a respective harmonic frequency can be random and/or pseudo-random.

Figure 4:
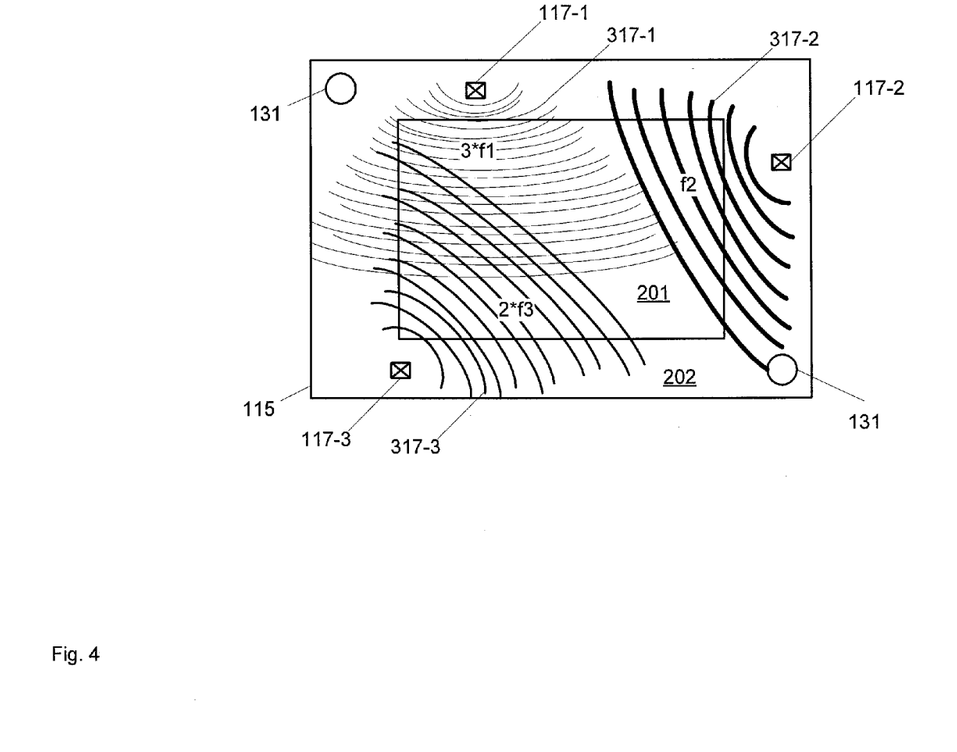
FIG. 4 depicts the surface of FIG. 2 in operation, according to alternative non-limiting implementations.

Hence, attention is next directed to FIG. 4, which is substantially similar to FIG. 3, with like elements having like numbers, however a respective frequency of moving surface waves 317-1, 317-13 has changed to a respective harmonic frequency independent of the frequency of any other moving surface wave 317. Hence, moving surface wave 317-1 has a frequency of 3*f1, and moving surface wave 317-3 has a frequency of 2*f3, while moving surface wave 317-2 has a frequency of f2. In each instance, a respective frequency of a moving surface wave 317 can have previously changed to any other harmonic frequency and then to the frequency depicted; hence, FIG. 4 merely represents a snapshot of surface 115 at one given time.

In some implementations where one or more of actuators 117 changes between respective harmonic frequencies, actuators 117 which change between respective harmonic frequencies can be configured to change between respective harmonic frequencies continuously and/or to sweep between respective harmonic frequencies and/or to step between respective harmonic frequencies so that a frequency of a respective surface wave 317 would be generally continuously changing. In these implementations actuators 117 are configured to change frequency a range of respective drive frequencies such that actuators 117 are, at any given time, generating respective moving surface waves 317 in first region 201 at respective frequencies, the respective frequencies comprising non-integer multiples of each other. In other words, while implementations depicted in FIG. 4 show actuators 117 generating respective surface waves 317 that are integer multiples of a first respective frequency, in other implementations actuators 117 can sweep continuously between a range of respective frequencies as long as, at any given time, frequencies of respective moving surface waves 317 in first region 201 are non-integer multiples of each other. In some of these implementations, a given actuator 117 can be configured to jump non-continuously to from a first frequency to a second frequency during a sweep to avoid generating surface waves 317 that are harmonics of moving surface waves 317 generated by another actuator 117.

In FIG. 3 and FIG. 4, each of moving surface waves 317 are depicted as moving in a given direction based, for example, on a location of each actuator 117, and furthermore each moving surface wave 317 is depicted as having a given shape and/or a given profile. However, a given direction of movement and/or a given shape and/or given profile of moving surface waves 317 can be alternatively depend on a shape and/or configuration of surface 115 and/or first region 201 and hence other directions of movement and/or shapes and/or profiles of moving surface waves 317 are within the scope of present implementations.

Persons skilled in the art will appreciate that there are yet more alternative implementations and modifications possible. For example, surface 115 can be adapted to include one or more actuators 117 interacting with an integrator-facing side of surface 115, which can cause further surface waves to form at the integrator-facing side.

In addition, as also depicted in FIG. 1, projector 100 can optionally comprise at least one rigid-body vibrating device 199, for example, a vibrating motor, and the like, which induces rigid body vibration of surface 115; while optional device 199 is depicted as being attached to surface 115, optional device 199 can alternatively be attached to mounting apparatus 130, with rigid-body vibrations thereof being translated to surface 115 via mounting points 131.

Returning briefly to FIG. 1, while surface 115 is depicted at image plane 113, alternatively surface 115 can be located at image plane 123, or at any other image plane in projector 100, with dimensions of surface 115 and first region 201 adapted accordingly; indeed, any or all of components associated with operation and/or positioning of surface 115 can be adapted accordingly.

In yet further implementations, projector 100 can comprise a second surface, similar to first surface 115, which can be located at image plane 123, in addition to surface 115 located at image plane 113, with dimensions of the second surface and associated first region adapted accordingly; indeed, any or all of components associated with operation and/or positioning of such a second surface can be adapted accordingly.

Furthermore, while surface 115 is depicted as being substantially flat and/or planar, in other implementations surface 115 and/or portions thereof, need not be substantially flat and/or planar; for example, second region 202 can be curved and/or extend perpendicular to first region 201; indeed, any shape and/or configuration of surface 115 is within the scope of present implementations as long as surface 115 comprises at least first region 201 located at image plane 113, first region 201 being at least as large as the image formed at image plane 113, first region 201 configured to one or more of transmit and reflect the image formed at the image plane 113, and at least three actuators 117 are positioned to asymmetrically interact with surface 115, the at least three actuators 117 configured to generate respective moving surface waves in first region 201 at respective frequencies, the respective frequencies comprising non-integer multiples of each other, as described above.

Also with reference to FIG. 1 and FIG. 2, while first region 201 is depicted as being transmissive to light 109 (and hence first region 201 is transmissive to an image formed at image plane 113, and projector 100 and optics thereof are configured such that light 109 passes through first region 201), in other implementations first region 201 can be configured to reflect light 109 and hence first region 201 can reflect an image formed at image plane 113, however, projector 100 and optics thereof are adapted accordingly.

Figure 5:
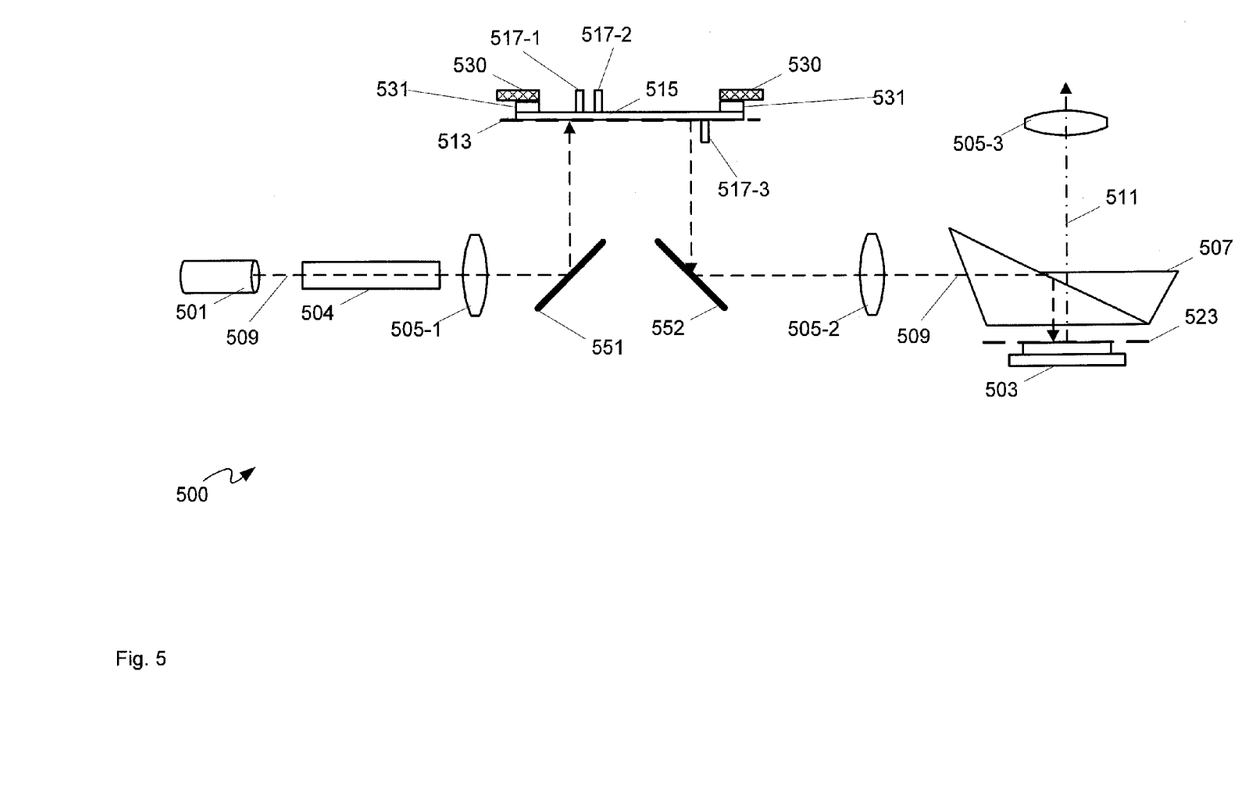
FIG. 5 depicts a schematic diagram of a projector with image plane modal vibration for speckle reduction, according to alternative non-limiting implementations.

Hence, attention is directed to FIG. 5 which depicts a schematic diagram of a projector 500 with image plane modal vibration for speckle reduction. Projector 500 is similar to projector 100, with like elements having like numbers, however in a "500" series, rather than a "100" series.

Hence, projector 500 comprises: a laser light source 501; a light modulator 503; optics (schematically represented by integrator rod 504, lenses 505-1, 505-2, 505-3 and prism 507) configured to convey light 509 from laser light source 501 to light modulator 503 and to project modulated light 511 from light modulator 503, the optics comprising an image plane 513 at which an image is formed by the optics by light 509 from laser light source 501; a surface 515 comprising at least a first region (similar to first region 201) located at image plane 513, the first region being at least as large as the image formed at image plane 513, the first region configured to one or more of transmit and reflect the image formed at the image plane 513; and at least three actuators 517-1, 517-2, 517-3, positions of interaction of least three actuators 517-1, 517-2, 517-3 with surface 515 are asymmetric relative to surface 115, 517-3 configured to generate respective moving surface waves in the first region at respective frequencies, the respective frequencies comprising non-integer multiples of each other.

Lenses 505-1, 505-2, 505-3 will be referred to hereafter, collectively, as lenses 505 and, generically, as a lens 505; similarly, actuators 517-1, 517-2, 517-3 will be referred to hereafter, collectively, actuators 517 and, generically, as an actuator 517.

Furthermore, as with projector 100, projector 500 can comprise at least a second image plane 523 located at a surface of light modulator 103, as well as a mounting apparatus 530 and mounting points 531 mounting surface 515 to mounting apparatus.

Hence, projector 500 is substantially similar to projector 100, however projector 500 further comprises a mirror 551 which reflects light 509 exiting integrator rod 504 towards surface 515, a first region of which reflective rather than transmissive as in projector 100, and a mirror 552 which reflects light 509 received from surface 515 to light modulator 503. In other words, in projector 500, a first region of surface 515 is reflective, rather than transmissive, and optics of projector 500 are adapted accordingly. Indeed, while optics of projector 500 are depicted as including mirrors 551, 552, optics of projector 500 can be adapted in any manner to direct light to a reflective first region of surface 515.

Figure 6:
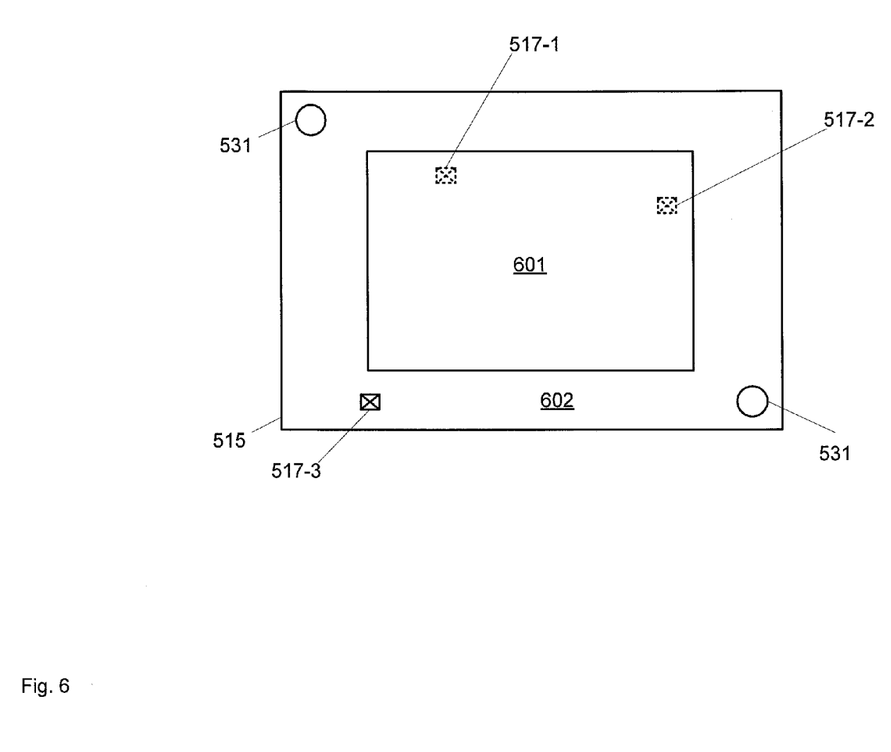
FIG. 6 depicts a schematic view of a reflecting surface located at an image plane of the projector of FIG. 5, according to non-limiting implementations.

Attention is next directed to FIG. 6 which depicts a front side of surface 515, which includes a front side, located at image plane 513, and a back side opposite the front side, and a first region 601 (similar to first region 201) is located on the front side and configured to reflect the image formed at image plane 515, positions of one or more of at least three actuators 517 at surface 515 being located at the back side and/or in a second region 602 (similar to second region 202). For example, positions of actuators 517-1, 517-2 and mounting points 531 are depicted in outline, indicating actuators 517-1, 517-2 are located on a back side of surface 515 in a region corresponding to first region 601, while a position of actuator 517-3 is located in second region 602 on a same side as first region 601.

Hence, surface 515 can be similar to surface 115 depicted in FIG. 2 however the corresponding first region 601 of surface 515 is reflective rather than transmissive.

Furthermore, while surface 515 can comprise second region 602, similar to second region 202, such a second region 602 is optional as actuators 517 and mounting points 531 can be located on a backside of surface 515, opposite a side where the reflective first region is located.

Figure 7:
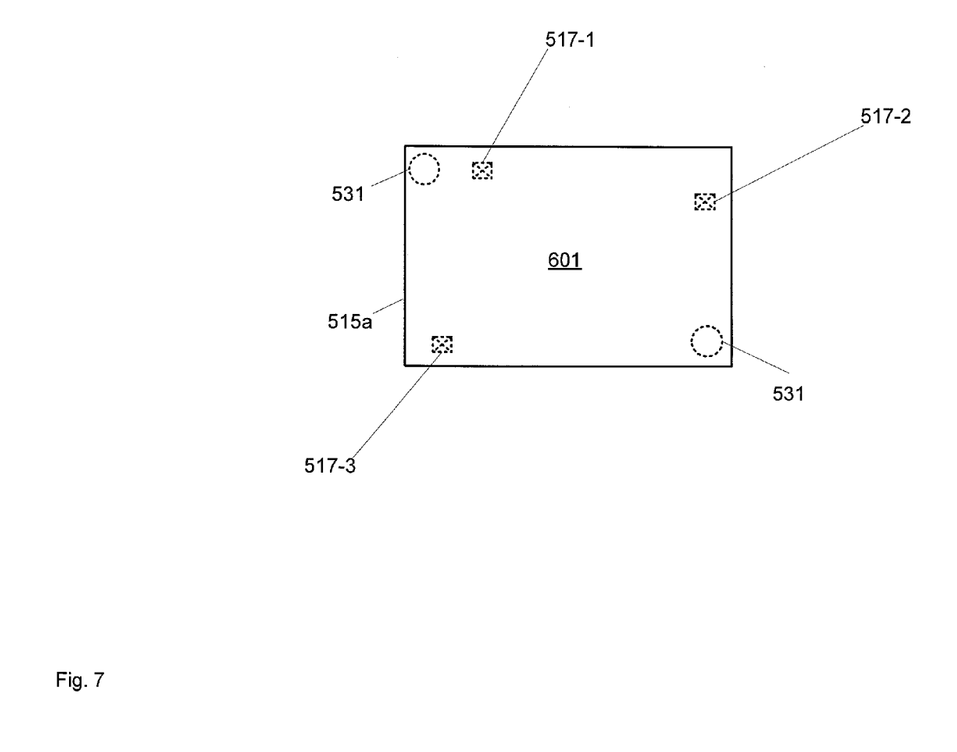
FIG. 7 depicts a schematic view of a reflecting surface located at an image plane of the projector of FIG. 5, according to alternative non-limiting implementations.

For example, attention is directed to FIG. 7 which depicts an alternative surface 515a, which can replace surface 515 in projector 500, surface 515a comprising only first region 601 and not second region 602; in other words, in depicted implementations, surface 515a and reflective first region 601 generally coincide and/or have the same dimensions, and actuators 517 and mounting points 531 can be located on a backside of surface 515a, as indicated by actuators 517 and mounting points 531 being depicted in outline in FIG. 7.

Furthermore, it is assumed that, when actuators 517 are located at a back side of surface 515 and/or surface 515a, moving surface waves (similar to moving surface waves 317) that originate at the back side of surface 515 translate to an opposite side where reflective first region 601 is located.

Furthermore, implementations of reflective surfaces described herein can be combined with transmissive surfaces described herein; for example, projector 500 can be adapted to include a surface similar to surface 115 at image plane 523 in addition to surface 515 at image plane 513.

Described herein are projectors having a laser light source and a surface located at an image plane, and actuators which interact with the surface to generate surface waves in a random and/or pseudo-random manner, to change light paths at points of light in an image at the image plane to mitigate speckle in the projector.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A projector comprising:
a laser light source; a light modulator; optics configured to convey light from the laser light source to the light modulator and to project modulated light from the light modulator, the optics comprising an image plane at which an image is formed by the optics by the light from the laser light source;
a surface comprising at least a first region located at the image plane, the first region being at least as large as the image formed at the image plane, the first region configured to one or more of transmit and reflect the image formed at the image plane; and
at least three actuators, positions of interaction of the least three actuators with the surface are asymmetric relative to the surface, the at least three actuators configured to generate respective moving surface waves in the first region at respective frequencies, the respective frequencies comprising non-integer multiples of each other.

2. The projector of claim 1, wherein the respective frequencies further comprise non-harmonics of each other.

3. The projector of claim 1, wherein the positions of interaction of the at least three actuators to the surface are selected to eliminate standing nodes formed by the respective moving surface waves in at least the first region.

4. The projector of claim 1, wherein each of the at least three actuators are configured to change a respective frequency of the respective moving surface waves from a first respective frequency to one or more respective harmonic frequencies.

5. The projector of claim 4, wherein each of the at least three actuators are configured to change the respective frequency of the respective moving surface waves from the first respective frequency to the one or more respective harmonic frequencies and back to the first respective frequency in a sequence.

6. The projector of claim 1, wherein each of the at least three actuators are positioned to interact with the surface outside the first region.

7. The projector of claim 1, wherein each of the at least three actuators comprise an eccentrically mounted rotational motor.

8. The projector of claim 1, wherein the first region is configured to transmit the image formed at the image plane, the surface further comprising a second region connected to the first region, and the positions of interaction of the at least three actuators with the surface are located in the second region.

9. The projector of claim 1, wherein the surface comprises a front side, located at the image plane, and a back side, the first region located on the front side and configured to reflect the image formed at the image plane, the positions of interaction of the at least three actuators to the surface being located the back side.

10. The projector of claim 1, wherein the surface comprises a front side, located at the image plane, a back side, and a second region connected to the first region, the first region located on the front side and configured to reflect the image formed at the image plane, the positions of interaction of the at least three actuators to the surface being located at one or more of the back side and in the second region.

11. The projector of claim 1, further comprising a mounting apparatus, the surface being attached to the mounting apparatus at one or more mount points.

12. The projector of claim 11, wherein each of the one or more mount points comprises a damping apparatus configured to damp one or more of the respective moving surface waves in the first region.

13. The projector of claim 11, wherein each of the one or more mount points is located outside of the first region.

14. The projector of claim 1, wherein the optics comprises an integrating rod located between the laser light source and the light modulator, and the image plane is located to receive images from an output face of the integrating rod such that the first region of the surface changes relative light paths of the light from the laser light source in the images.

15. The projector of claim 1, wherein the surface comprises one or more of glass, high temperature glass, plastic, and high temperature plastic.

16. The projector of claim 1, further comprising a rigid-body vibrating device configured to induce rigid body vibration of the surface.

* * * * *

UNITED STATES PATENT AND TRADEMARK OFFICE
CERTIFICATE OF CORRECTION

PATENT NO. : 9,778,478 B1
APPLICATION NO. : 15/285047
DATED : October 3, 2017
INVENTOR(S) : Daniel Robert Adema, Darren Pastrik and Graham Hill Page 1 of 1

It is certified that error appears in the above-identified patent and that said Letters Patent is hereby corrected as shown below:

On the Title Page

(73) Assignee: "CHRISTINE DIGITAL SYSTEMS USA, INC." to --CHRISTIE DIGITAL SYSTEMS USA, INC.--

Signed and Sealed this
Twelfth Day of February, 2019

Andrei Iancu
*Director of the United States Patent and Trademark Office*